(12) United States Patent
Shiono et al.

(10) Patent No.: US 7,868,119 B2
(45) Date of Patent: Jan. 11, 2011

(54) COATING COMPOSITION

(75) Inventors: Mikio Shiono, Annaka (JP); Kenichi Fukuda, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 521 days.

(21) Appl. No.: 11/979,555

(22) Filed: Nov. 5, 2007

(65) Prior Publication Data
US 2008/0132653 A1 Jun. 5, 2008

(30) Foreign Application Priority Data
Nov. 6, 2006 (JP) ............................. 2006-299771

(51) Int. Cl.
*C08G 77/24* (2006.01)
(52) U.S. Cl. .............................. 528/36; 528/31; 528/32; 524/588
(58) Field of Classification Search .................. 528/31, 528/32, 36; 524/588
See application file for complete search history.

(56) References Cited

U.S. PATENT DOCUMENTS

2006/0014895 A1   1/2006   Shiono

FOREIGN PATENT DOCUMENTS

| EP | 0725113 A1 | 8/1996 |
|---|---|---|
| EP | 1 614 718 | * 11/2006 |
| JP | 08-127720 A | 5/1996 |
| JP | 9-95615 | 4/1997 |
| JP | 2001-72868 A | 3/2001 |
| JP | 2006-22223 A | 1/2006 |

OTHER PUBLICATIONS

3M Product Information (3M Fluorinert Liquids for Electronic Manufacturing, (2003)).*

* cited by examiner

*Primary Examiner*—Kuo-Liang Peng
(74) *Attorney, Agent, or Firm*—Birch, Stewart, Kolasch & Birch, LLP

(57) ABSTRACT

A coating composition comprises a fluoroelastomer composition and a diluent solvent consisting of a perfluoroalkyl-substituted aromatic compound and a perfluoro organic compound, the fluoroelastomer composition comprising (A) a linear perfluoropolyether compound, (B) a fluorinated organohydrogensiloxane, (C) a platinum catalyst, and (D) an organopolysiloxane containing an SiH group and an epoxy or trialkoxysilyl group. The composition cures into a fluoroelastomer having excellent characteristics and achieves a firm adhesion to a broad range of substrates by brief heating at relatively low temperatures.

6 Claims, No Drawings

COATING COMPOSITION

CROSS-REFERENCE TO RELATED APPLICATION

This non-provisional application claims priority under 35 U.S.C. §119(a) on Patent Application No. 2006-299771 filed in Japan on Nov. 6, 2006, the entire contents of which are hereby incorporated by reference.

FIELD OF THE INVENTION

This invention relates to coating compositions for forming fluoroelastomer coatings.

BACKGROUND ART

Fluoroelastomer compositions which cure by an addition reaction between alkenyl groups and hydrosilyl groups are known in the art. Related compositions imparted with self-adhesiveness by additionally including, as a third component, an organopolysiloxane bearing hydrosilyl groups and epoxy and/or trialkoxysilyl groups, have also been proposed (JP-A 9-95615). Addition of carboxylic anhydride to these compositions results in compositions with improved adhesion to polyphenylene sulfide resins and polyamide resins as disclosed in JP-A 2001-72868.

By brief heating, these compositions can be cured and at the same time, bonded to a variety of substrates. The cured products have excellent gasoline resistance, oil resistance, chemical resistance, heat resistance and low-temperature properties, low moisture permeability and excellent electrical characteristics. Such compositions are used in sealing, potting and coating applications within a variety of industrial fields where these properties are required.

Particularly in the coating application, the compositions are often used in solution form after they are diluted with fluorinated solvents. Suitable fluorinated solvents which are used to form coating solutions include 1,3-bis(trifluoromethyl)benzene, Fluorinert® (3M), perfluorobutyl methyl ether, and perfluorobutyl ethyl ether.

Use of these solvents alone, however, gives rise to a problem that a uniform solution is not obtained, or even when a uniform solution is obtained, a coating resulting from the solvent volatilizing off becomes uneven in appearance or thickness. For example, when a solution is prepared by combining the aforementioned curable composition with one of the aforementioned solvent and applied as a protective coating onto a substrate having electric and electronic parts mounted thereon, some cured coatings have a mottled appearance and a varying thickness.

In the application of protective coatings on electric and electronic parts, there is a need for a coating composition in which a fluoroelastomer composition exhibiting good adhesion to a variety of substrates of metals and plastics is uniformly dissolved and which can form a cured coating having a uniform and smooth appearance after drying.

DISCLOSURE OF THE INVENTION

It is therefore an object of the invention to provide a coating composition which has excellent gasoline resistance, chemical resistance, heat resistance, low-temperature properties, low moisture permeability, and excellent electrical characteristics, and which forms a fluoroelastomer coating exhibiting a firm adhesion to a variety of substrates by brief heating at relatively low temperatures.

The inventor has found that a fluoroelastomer composition is obtained by adding to an addition reaction-curable composition comprising (A) a linear polyfluoro compound containing at least two alkenyl groups per molecule and having a perfluoropolyether structure in its backbone, (B) a fluorinated organohydrogensiloxane having at least two silicon-bonded hydrogen atoms per molecule, and (C) a platinum group metal catalyst, (D) an organopolysiloxane containing per molecule at least one hydrogen atom bonded to a silicon atom directly and at least one group selected from among epoxy and trialkoxysilyl groups, which is bonded to a silicon atom via a carbon atom or carbon and oxygen atoms, and that when this fluoroelastomer composition is combined with a diluent solvent consisting of 60 to 90% by weight of a perfluoroalkyl-substituted aromatic compound and 40 to 10% by weight of a perfluoro organic compound, there is obtained a uniform solution, which gives a uniform cured coating after the solvent volatilizes off.

The invention provides a coating composition comprising 100 parts by weight of a fluoroelastomer composition and 10 to 1,000 parts by weight of a diluent solvent consisting of a perfluoroalkyl-substituted aromatic compound and a perfluoro organic compound in a weight ratio in the range from 60/40 to 90/10. The fluoroelastomer composition comprises (A) a linear polyfluoro compound containing at least two alkenyl groups per molecule and having a perfluoropolyether structure in its backbone, (B) a fluorinated organohydrogensiloxane having at least two silicon-bonded hydrogen atoms per molecule, (C) a platinum group metal catalyst, and (D) an organopolysiloxane containing per molecule at least one hydrogen atom bonded to a silicon atom directly and at least one group selected from among epoxy and trialkoxysilyl groups, which is bonded to a silicon atom via a carbon atom or carbon and oxygen atoms.

In a preferred embodiment, the perfluoro organic compound is at least one compound selected from the class consisting of a perfluoroalkane, perfluoro cyclic ether, and perfluoropolyether.

In a preferred embodiment, the perfluoroalkyl-substituted aromatic compound has the general formula (2):

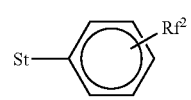
(2)

wherein St is H or $CF_3$, and $Rf^2$ is a straight or branched perfluoroalkyl group of 1 to 4 carbon atoms.

In a preferred embodiment, component (A) is a linear polyfluoro compound having the general formula (1):

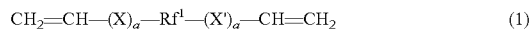
(1)

wherein X is $-CH_2-$, $-CH_2O-$, $-CH_2OCH_2-$ or $-Y-NR-CO-$; Y is $-CH_2-$ or an o-, m- or p-dimethylsilylphenylene group of structural formula (Z):

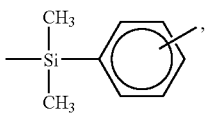

and R is hydrogen or a substituted or unsubstituted monovalent hydrocarbon group; X' is —$CH_2$—, —$OCH_2$—, —$CH_2OCH_2$— or —CO—NR—Y'—; Y' is —$CH_2$— or an o-, m- or p-dimethylsilylphenylene group of structural formula (Z'):

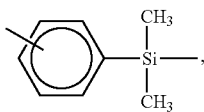

and R is as defined above; the subscript "a" is independently 0 or 1; $Rf^1$ is a divalent perfluoropolyether group of the general formula (i):

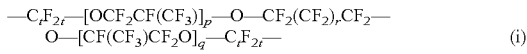

wherein p and q are integers of 1 to 150, the sum of p and q is 2 to 200 on average, r is an integer of 0 to 6, and t is 2 or 3, or a divalent perfluoropolyether group of the general formula (ii):

wherein u is an integer of 1 to 200, v is an integer of 1 to 50, and t is as defined above.

In a preferred embodiment, the fluorinated organohydrogensiloxane (B) has on the molecule at least one group selected from among monovalent perfluoroalkyl groups, monovalent perfluorooxyalkyl groups, divalent perfluoroalkylene groups and divalent perfluorooxyalkylene groups.

In a preferred embodiment, the organosiloxane (D) further contains per molecule at least one monovalent perfluoroalkyl or monovalent perfluorooxyalkyl group bonded to a silicon atom via a carbon atom or carbon and oxygen atoms.

BENEFITS OF THE INVENTION

The coating composition of the invention is useful as a coating solution of a fluoroelastomer composition which has excellent gasoline resistance, oil resistance, chemical resistance, heat resistance, low-temperature properties, low moisture permeability, and excellent electrical characteristics, and which on brief heating at relatively low temperatures, forms a cured coating exhibiting a firm adhesion to a variety of substrates including metals and plastics. Then a uniform and smooth coating of fluoroelastomer is readily formed from the coating composition.

DESCRIPTION OF THE PREFERRED EMBODIMENTS

In the specification, the singular forms "a," "an" and "the" include plural referents unless the context clearly dictates otherwise.

In the formulas, "Me" stands for methyl and "Ph" stands for phenyl.

The coating composition of the invention is arrived at by blending and dissolving a fluoroelastomer composition comprising components (A) to (D) in a specific diluent solvent. Reference is first made to components (A) to (D).

Component A

Component (A) is a linear polyfluoro compound containing at least two alkenyl groups per molecule and having a perfluoropolyether structure in the backbone. It is a base polymer in the fluoroelastomer composition contemplated herein. The preferred linear polyfluoro compound has the general formula (1).

Herein, X is —$CH_2$—, —$CH_2O$—, —$CH_2OCH_2$— or —Y—NR—CO—, wherein Y is —$CH_2$— or an o-, m- or p-dimethylsilylphenylene group of structural formula (Z):

and R is hydrogen or a substituted or unsubstituted monovalent hydrocarbon group. X' is —$CH_2$—, —$OCH_2$—, —$CH_2OCH_2$— or —CO—NR—Y'—, wherein Y' is —$CH_2$— or an o-, m- or p-dimethylsilylphenylene group of structural formula (Z'):

and R is as defined above. $Rf^1$ is a divalent perfluoropolyether group. The subscript "a" is each independently 0 or 1.

R is a hydrogen atom or a substituted or unsubstituted, monovalent hydrocarbon group having preferably 1 to 12 carbon atoms, and more preferably 1 to 10 carbon atoms. Specific examples of hydrocarbon groups include alkyl groups such as methyl, ethyl, propyl, butyl, hexyl, cyclohexyl and octyl; aryl groups such as phenyl and tolyl; aralkyl groups such as benzyl and phenylethyl; and substituted monovalent hydrocarbon groups in which some or all of the hydrogen atoms are substituted by halogen atoms such as fluorine.

Preferably, $Rf^1$ is a divalent perfluoropolyether structure having the general formula (i) or (ii).

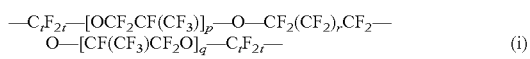

In formula (i), p and q are integers of 1 to 150, an average sum of p and q is 2 to 200, r is an integer of 0 to 6, and t is 2 or 3.

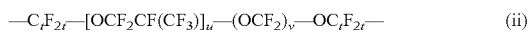

In formula (ii), u is an integer of 1 to 200, v is an integer of 1 to 50, and t is as defined above.

Preferred examples of Rf¹ group include those of the following three formulas:

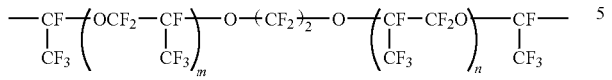

wherein m and n are each an integer of at least 1, and an average sum of m+n is from 2 to 200;

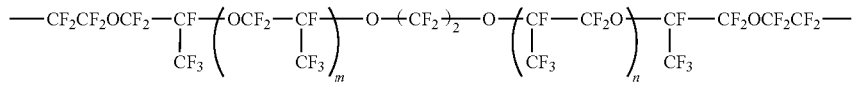

wherein m and n are each an integer of at least 1, and an average sum of m+n is from 2 to 200; and

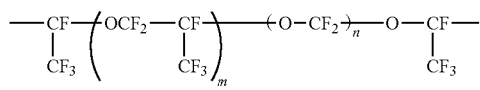

wherein m is an integer of 1 to 200, and n is an integer of 1 to 50. Of these, the divalent groups with the structure of the first formula are most preferred.

Preferred examples of component (A) include compounds of the general formula (3).

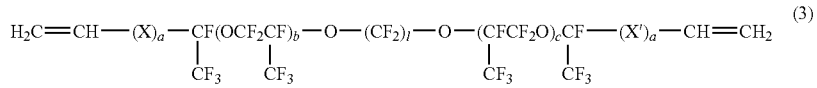

Herein X is —$CH_2$—, —$CH_2$O—, —$CH_2OCH_2$— or —Y—NR—CO—, wherein Y is —$CH_2$— or an o-, m- or p-dimethylsilylphenylene group of structural formula (Z):

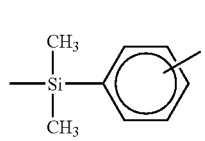

and R is hydrogen, methyl, phenyl or allyl. X' is —$CH_2$—, —$OCH_2$—, —$CH_2OCH_2$— or —CO—NR—Y'—, wherein Y' is —$CH_2$— or an o-, m- or p-dimethylsilylphenylene group of structural formula (Z'):

and R is as defined above. The subscript "a" is independently 0 or 1, "l" is an integer from 2 to 6, and b and c are each an integer from 0 to 200.

Illustrative examples of linear polyfluoro compounds of formula (1) include the compounds having the following formulas.

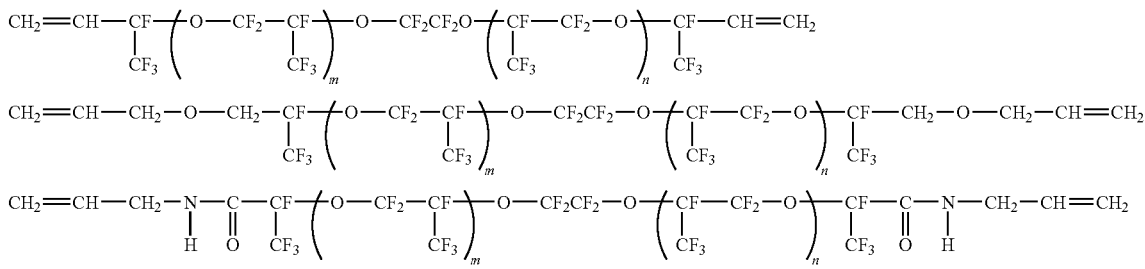

-continued

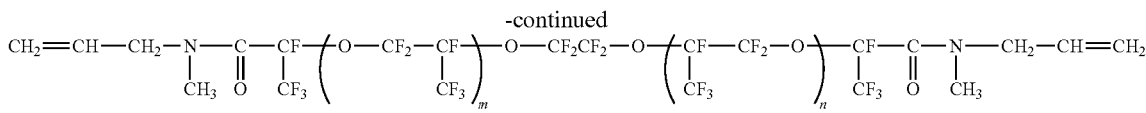

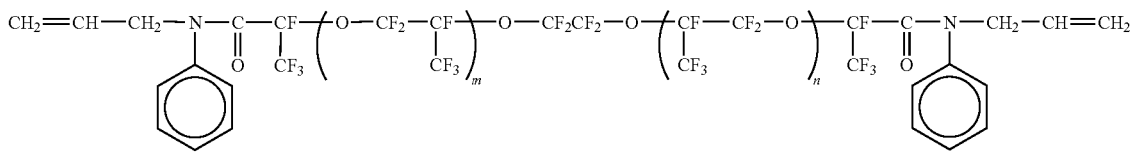

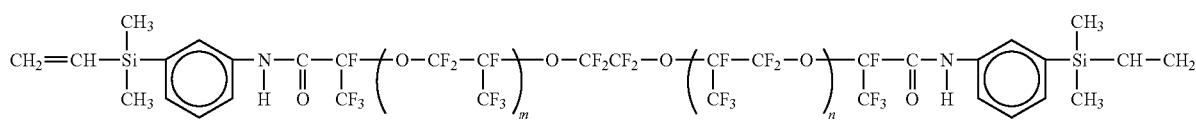

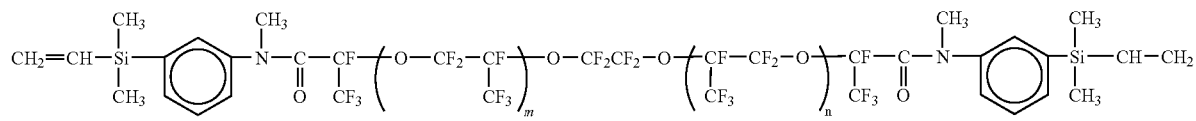

In the above formulas, m and n are each an integer from 0 to 200, and the sum of m+n is from 6 to 200.

For the fluoroelastomer composition to have suitable physical properties when used for such purposes as sealing, potting, coating and impregnation, and also in the cured state, it is desirable that the linear polyfluoro compound of formula (1) have a viscosity at 23° C. in a range of 100 to 100,000 mPa·s, preferably 500 to 50,000 mPa·s, and even more preferably 1,000 to 20,000 mPa·s, as measured by a rotational viscometer. An appropriate viscosity for a particular application can be selected from within this viscosity range.

These linear polyfluoro compounds may be used singly or as a combination of two or more thereof.

Component B

Component (B) is a fluorinated organohydrogensiloxane having at least two silicon-bonded hydrogen atoms (sometimes referred to below as hydrosilyl groups, or Si—H groups) per molecule. It functions as a crosslinker or chain extender for component (A). For good compatibility with and dispersibility in component (A) and uniformity after curing, it is preferable for component (B) to have on the molecule at least one fluorine-bearing group selected from among monovalent perfluoroalkyl groups, monovalent perfluorooxyalkyl groups, divalent perfluoroalkylene groups and divalent perfluorooxyalkylene groups.

Illustrative examples of such fluorine-bearing groups include those of the following general formulas:

$C_gF_{2g+1}-$ (wherein g is an integer from 1 to 20, and preferably from 2 to 10), $-C_gF_{2g}-$ (wherein g is an integer from 1 to 20, and preferably from 2 to 10), $F-[CF(CF_3)CF_2O]_f-C_hF_{2h}-$ (wherein f is an integer from 2 to 200, and preferably from 2 to 100, and h is an integer from 1 to 3), $-CF(CF_3)-[OCF_2CF(CF_3)]_i-O-CF_2CF_2-O-$
$[CF(CF_3)CF_2O]_j-CF(CF_3)-$ (wherein i and j are each an integer of at least 1, an average sum of i+j is from 2 to 200, and preferably from 2 to 100), and $-(CF_2O)_r-(CF_2CF_2O)_s-CF_2-$ (wherein r and s are each an integer from 1 to 50).

Divalent linkages for connecting the above perfluoroalkyl, perfluorooxyalkyl, perfluoroalkylene or perfluorooxyalkylene groups with silicon atoms include alkylene and arylene groups and combinations thereof, which may be separated by an ether-bonding oxygen atom, amide linkage, carbonyl linkage, or combinations thereof. Specific examples include linkages having 2 to 12 carbon atoms, such as —CH$_2$CH$_2$—, —CH$_2$CH$_2$CH$_2$—, —CH$_2$CH$_2$CH$_2$OCH$_2$—, —CH$_2$CH$_2$CH$_2$—NH—CO—, —CH$_2$CH$_2$CH$_2$—N(Ph)—CO—, —CH$_2$CH$_2$CH$_2$—N(CH$_3$)—CO—, and —CH$_2$CH$_2$CH$_2$—O—CO—.

Illustrative examples of component (B) having such fluorine-bearing groups include the following compounds. These compounds may be used singly or as combinations of two or more thereof.

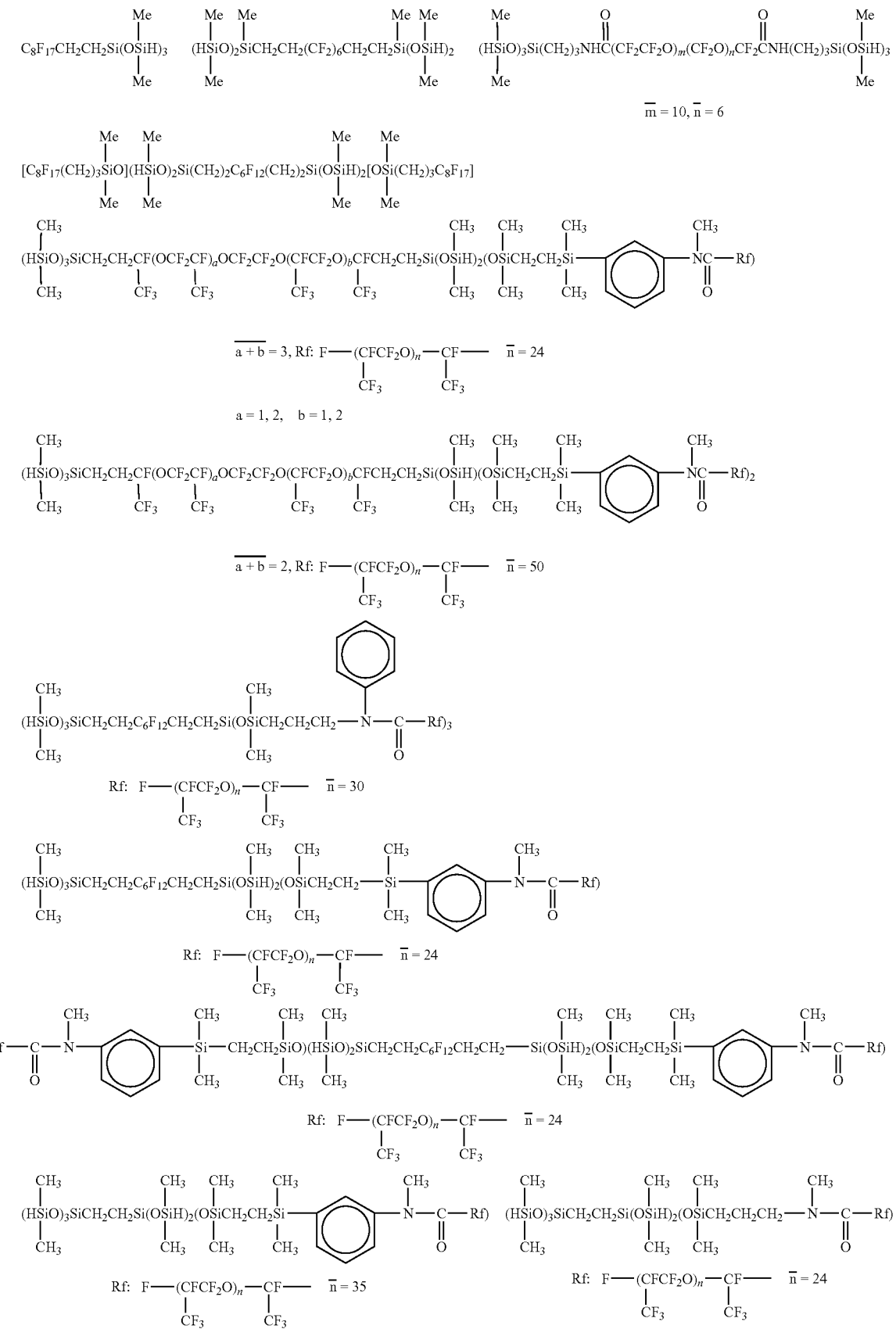

-continued
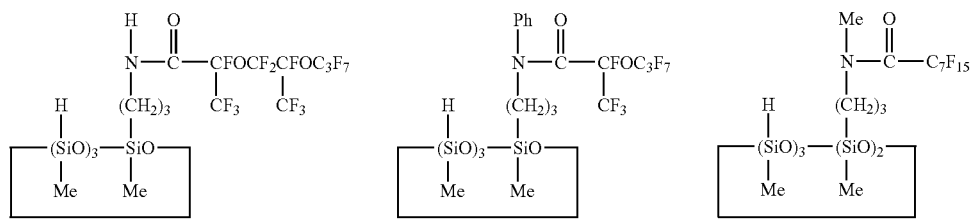
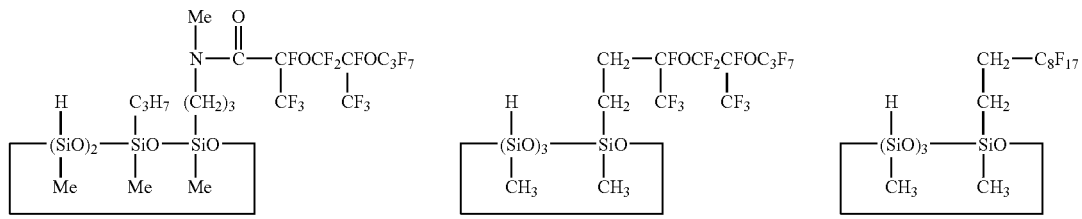
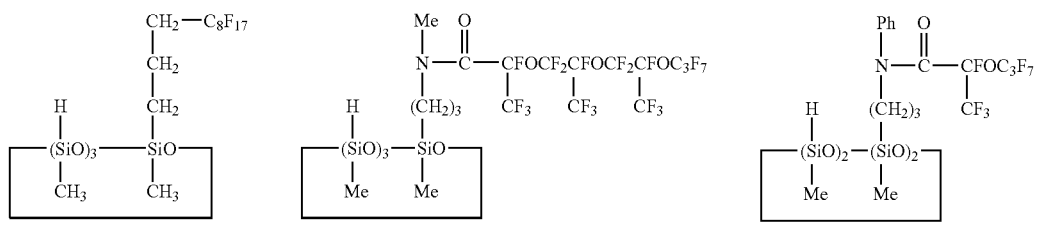
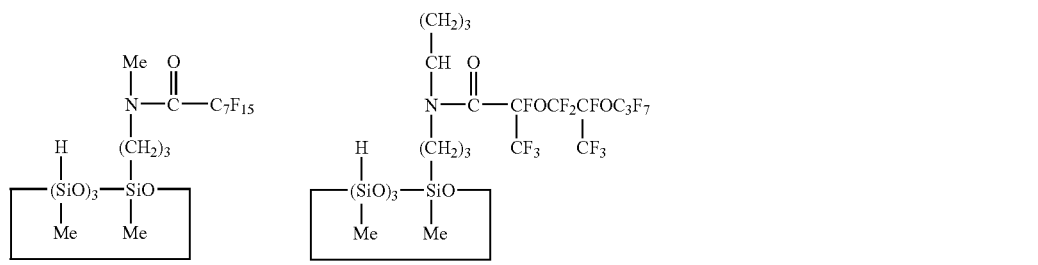
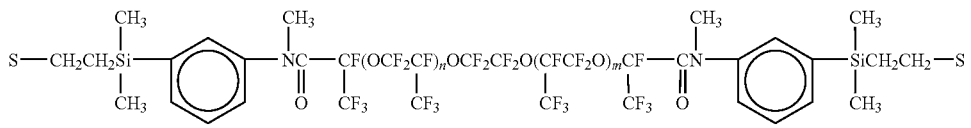
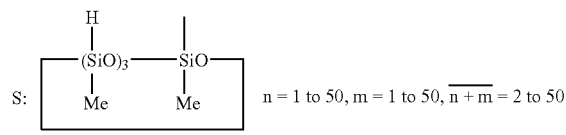
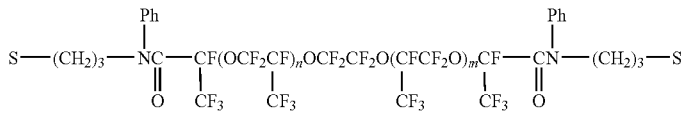
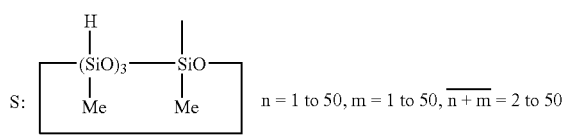
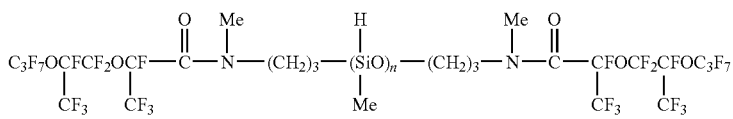

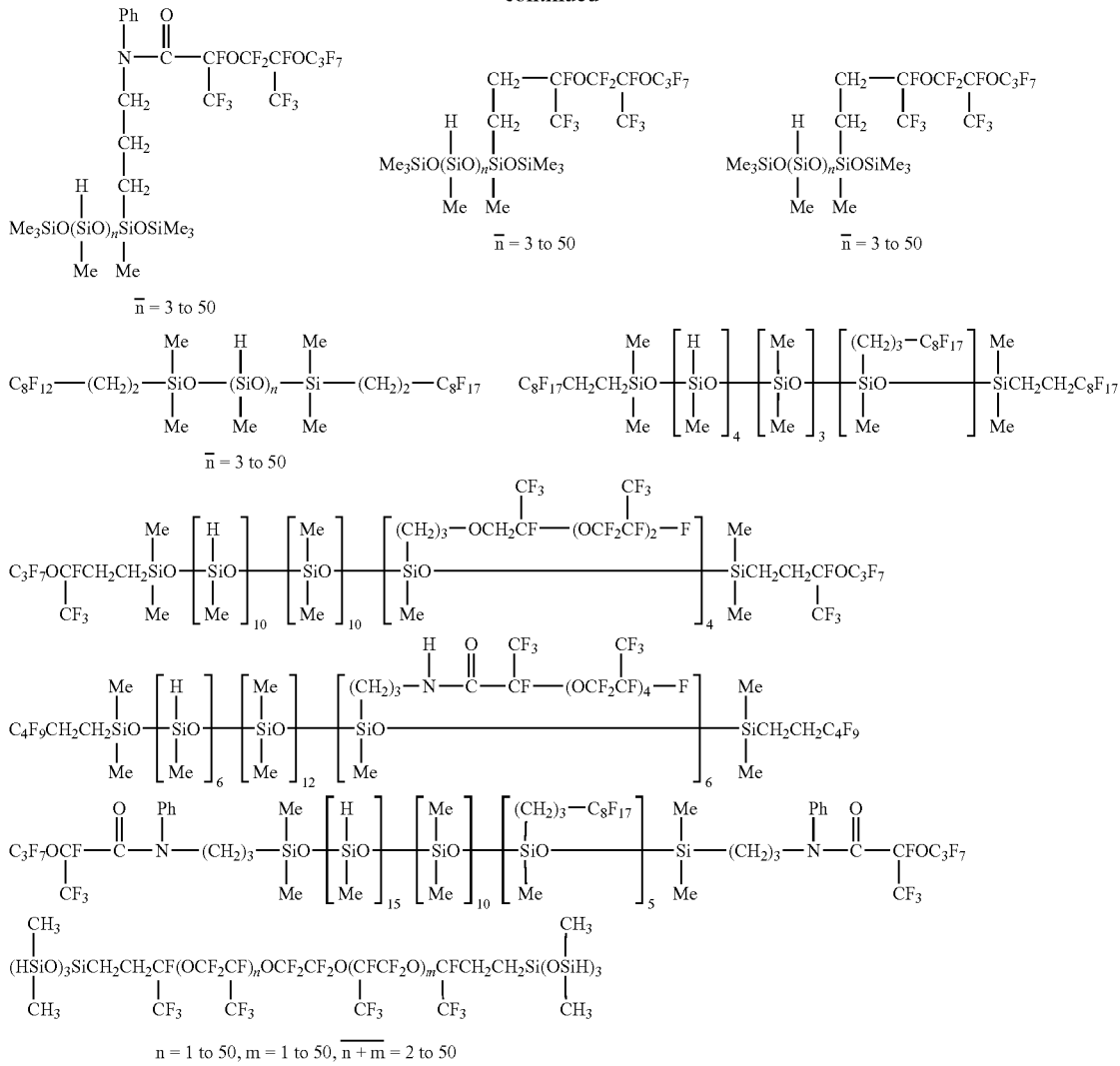

n = 1 to 50, m = 1 to 50, $\overline{n+m}$ = 2 to 50

Component (B) is included in an amount effective for curing component (A), and specifically an amount corresponding to 0.5 to 3.0 moles, and preferably 0.8 to 2.0 moles, of hydrosilyl (Si—H) groups on component (B) per mole of total alkenyl groups (e.g., vinyl, allyl, cycloalkenyl groups) on component (A). If there are too few hydrosilyl groups, a sufficient degree of crosslinking may not occur, resulting in an under-cured product. On the other hand, too many hydrosilyl groups can induce foaming during the curing process.

Component C

Component (C) is a platinum group metal catalyst, commonly known as hydrosilylation catalyst. It promotes addition reaction between alkenyl groups in component (A) and hydrosilyl groups in component (B). Such catalysts are generally noble metal compounds which are expensive. Of these, use is often made of platinum and platinum compounds which are more readily available.

Exemplary platinum compounds include chloroplatinic acid and complexes of chloroplatinic acid with olefins (e.g., ethylene), alcohols or vinyl siloxanes, and metallic platinum on supports such as silica, alumina and carbon. Known platinum group metal catalysts other than platinum compounds include rhodium, ruthenium, iridium and palladium compounds, specific examples of which are $RhCl(PPh_3)_3$, $RhCl(CO)(PPh_3)_2$, $Ru_3(CO)_{12}$, $IrCl(CO)(PPh_3)_2$ and $Pd(PPh_3)_4$.

If these catalysts are solid catalysts, they may be used in a solid state. However, for obtaining a uniform cured product, it is preferable to dissolve chloroplatinic acid or a complex thereof in a suitable solvent, and intimately mix the resulting solution with the linear polyfluoro compound (A).

Component (C) may be used in a catalytic amount, for example, in an amount of 0.1 to 500 ppm of platinum group metal based on the total weight of components (A) and (B).

Component D

Component (D) is an organopolysiloxane which is included to confer the fluoroelastomer composition with sufficient self-adhesiveness. In this sense, component (D) is also referred to as "tackifier." The organosiloxane bears on the molecule at least one silicon-bonded hydrogen atom and at least one group selected from among epoxy groups and trialkoxysilyl groups, which is bonded to a silicon atom through an intervening carbon atom or atoms or through intervening carbon and oxygen atoms. Preferred are those organosiloxanes which further have at least one monovalent perfluoroalkyl group or monovalent perfluorooxyalkyl group bonded to a silicon atom through an intervening carbon atom or atoms or through intervening carbon and oxygen atoms.

The organosiloxane (D) has a siloxane skeleton which may be either cyclic, linear or branched, or a combination of any of these. Organosiloxanes that can be used herein include those having the following average compositional formulas.

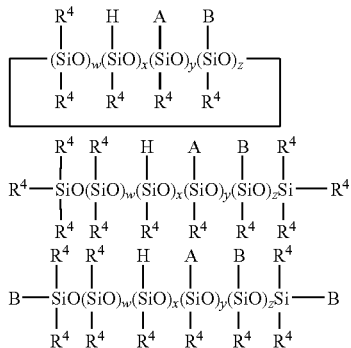

In these formulas, $R^4$ is a halogen-substituted or unsubstituted monovalent hydrocarbon group, A and B are as described below, w is an integer from 0 to 100, x is an integer from 1 to 100, y is an integer from 1 to 100, and z is an integer from 0 to 100.

$R^4$ is preferably a halogen-substituted and unsubstituted monovalent hydrocarbon group of 1 to 10 carbons, and more preferably 1 to 8 carbons. Specific examples include alkyl groups such as methyl, ethyl, propyl, butyl, hexyl, cyclohexyl and octyl; aryl groups such as phenyl and tolyl; aralkyl groups such as benzyl and phenylethyl; and substituted forms of the foregoing monovalent hydrocarbon groups in which some or all of the hydrogen atoms are substituted by fluorine or other halogen atoms. Of these, methyl is especially preferred.

It is preferred that w be from 0 to 20, x be from 1 to 20, y be from 1 to 20, z be from 1 to 20, and w+x+y+z be from 3 to 50.

The letter "A" in the above formulas represents an epoxy group and/or trialkoxysilyl group which is bonded to a silicon atom through an intervening carbon atom(s) or through intervening carbon and oxygen atoms. Specific examples include the following groups.

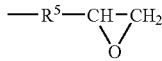

Herein, $R^5$ is a divalent hydrocarbon group with 1 to 10 carbon atoms, and preferably 1 to 5 carbon atoms, such as an alkylene or cycloalkylene group, which may be separated by an oxygen atom.

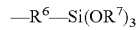

Herein, $R^6$ is a divalent hydrocarbon group of 1 to 10 carbon atoms, preferably 1 to 4 carbon atoms, such as an alkylene group; and $R^7$ is a monovalent hydrocarbon group of 1 to 8 carbon atoms, and preferably 1 to 4 carbon atoms, such as an alkyl group.

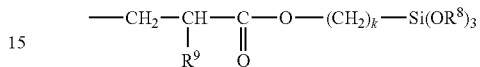

Herein, $R^8$ is a monovalent hydrocarbon group of 1 to 8 carbon atoms, and preferably 1 to 4 carbon atoms, such as an alkyl group; $R^9$ is a hydrogen atom or a methyl group, and k is an integer from 2 to 10.

The letter "B" in the above formulas represents a monovalent perfluoroalkyl group or perfluorooxyalkyl group which is bonded to a silicon atom through a carbon atom(s) or through carbon and oxygen atoms. Examples of the monovalent perfluoroalkyl group or perfluorooxyalkyl group include those of the general formulas:

(wherein s is an integer of 1 to 20, and preferably 2 to 10) and

(wherein f is an integer of 2 to 200, and preferably 2 to 100, and h is an integer of 1 to 3).

These organosiloxanes can be prepared by a standard technique, typically by effecting a partial addition reaction on an organohydrogenpolysiloxane bearing at least three silicon-bonded hydrogen atoms (Si—H groups) per molecule with a compound bearing an aliphatic unsaturated group (e.g., vinyl or allyl) and an epoxy group and/or trialkoxysilyl group and optionally, a compound having an aliphatic unsaturated group and a perfluoroalkyl or perfluorooxyalkyl group. The number of aliphatic unsaturated groups must be smaller than the number of Si—H groups.

In preparing the organosiloxane for use in the invention, the target substance may be isolated following reaction completion. It is also possible to use the reaction mixture from which only unreacted feedstock and the addition reaction catalyst have been removed.

Specific examples of organosiloxanes which may be used as component (D) include those having the following structural formulas. These compounds may be used singly or as combinations of two or more thereof.

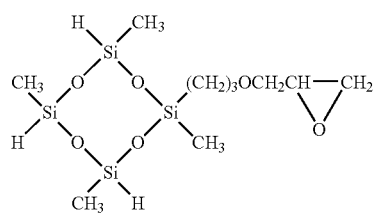 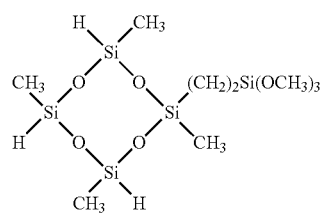 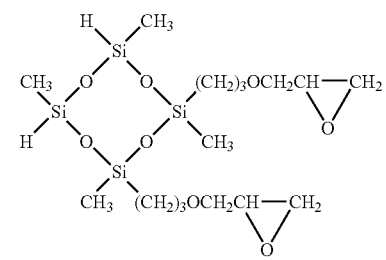

-continued
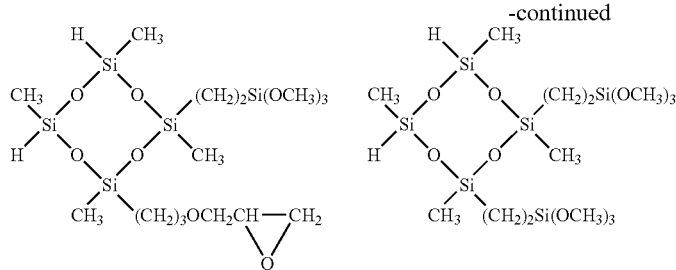
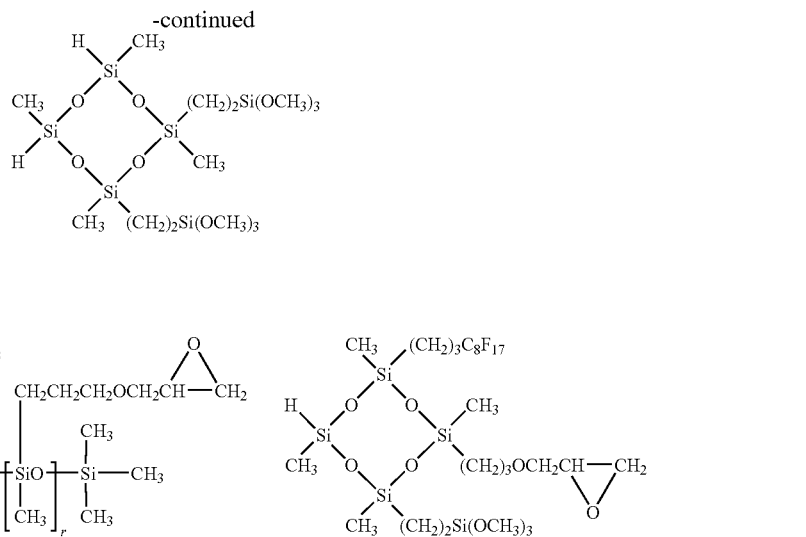
(the letters o, q and r represent positive integers, and p is 0 or a positive integer)
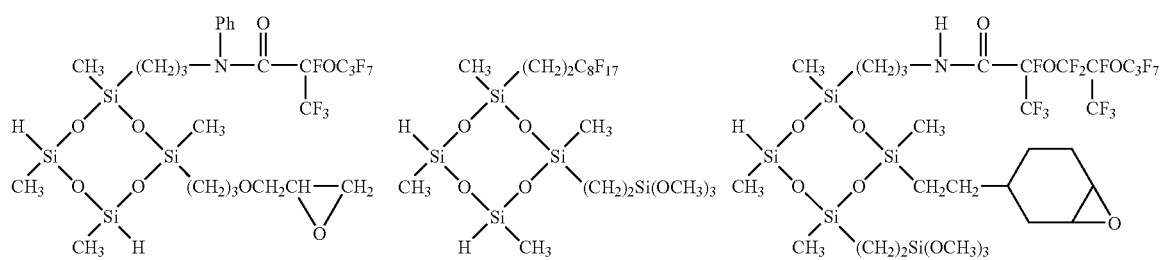
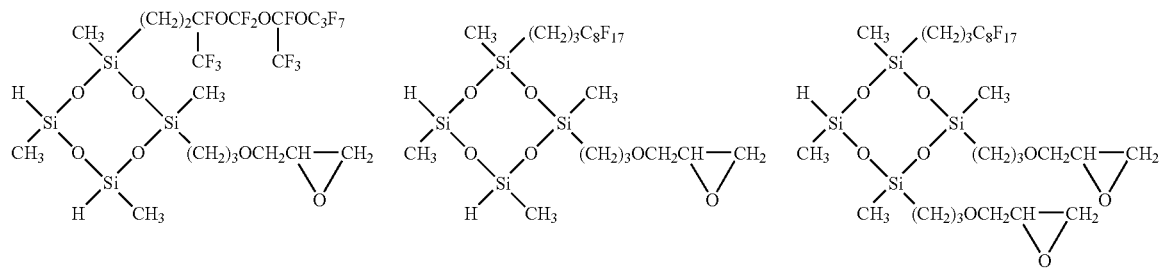
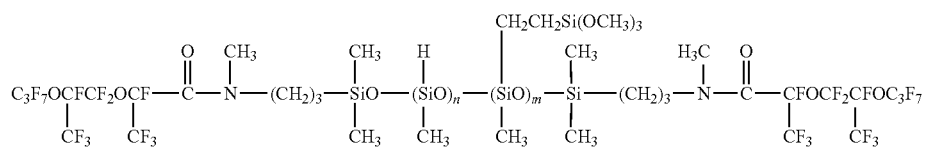
$\overline{n+m} = 3\text{-}50$
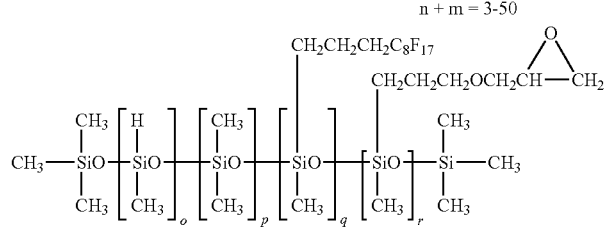
(the letters o, q and r represent positive integers, and p is 0 or a positive integer)

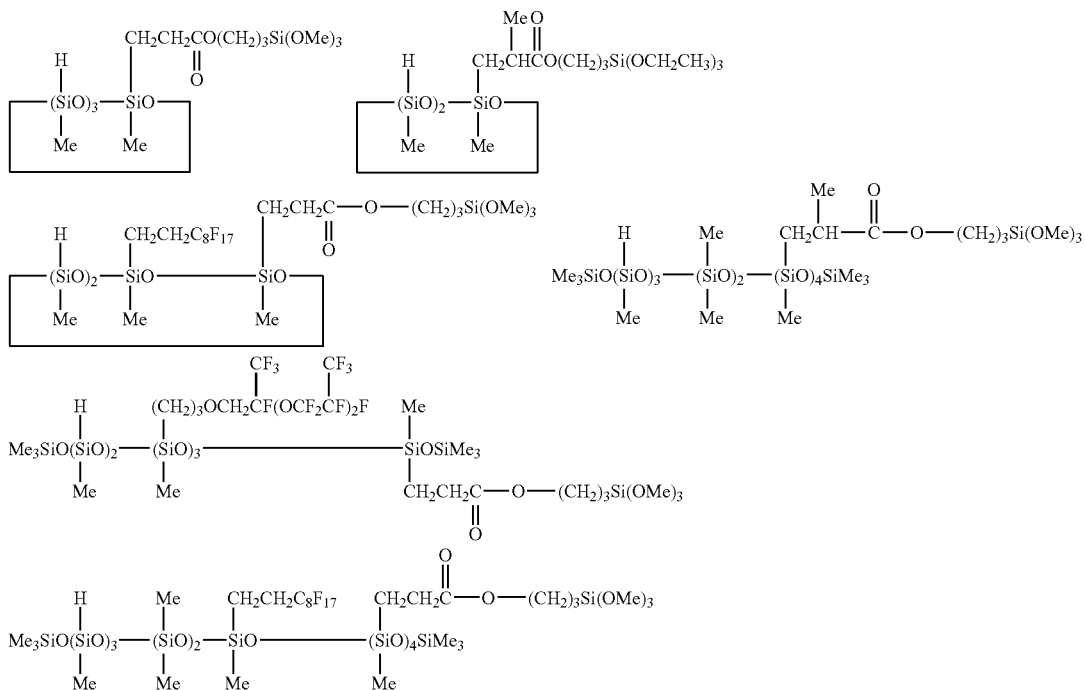

Component (D) is preferably included in an amount of 0.05 to 5.0 parts by weight, and more preferably 0.1 to 3.0 parts by weight, per 100 parts by weight of component (A). Less than 0.05 pbw of component (D) cannot achieve sufficient adhesion. More than 5.0 pbw of component (D) adversely affects the flow and interferes with the cure of the composition, and the resulting cured product has a diminished physical strength.

Diluent Solvent

According to the invention, the fluoroelastomer composition comprising components (A) to (D) described above is combined with a diluent solvent, which consists of a perfluoroalkyl-substituted aromatic compound and a perfluoro organic compound.

The perfluoroalkyl-substituted aromatic compound generally has the following general formula (2):

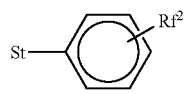
(2)

wherein St is H or $CF_3$, and $Rf^2$ is a straight or branched perfluoroalkyl group of 1 to 4 carbon atoms.

The perfluoroalkyl-substituted aromatic compounds typically have a boiling point of 50 to 200° C., and preferably 60 to 150° C. under atmospheric pressure (101.3 kPa). Compounds with a boiling point of lower than 50° C. will volatilize quickly and are thus difficult to handle whereas compounds with a boiling point of higher than 200° C. will volatilize slowly so that the fluoroelastomer composition may remain under-cured. Examples of perfluoroalkyl-substituted aromatic compounds include benzotrifluoride, 2-fluorobenzotrifluoride, 3-fluorobenzotrifluoride, 4-fluorobenzotrifluoride, 1,3-bis(trifluoromethyl)benzene, 1,4-bis(trifluoromethyl)benzene, 4-(trifluoromethyl)toluene, and perfluoroisopropylbenzene. Inter alia, 1,3-bis(trifluoromethyl)benzene and 1,4-bis(trifluoromethyl)benzene are preferred. These compounds may be used alone or in admixture of two or more.

As used herein, the "perfluoro organic compound" refers to organic compounds consisting of carbon and fluorine atoms, and organic compounds consisting of carbon, oxygen and fluorine atoms. The perfluoro organic compound used herein is preferably selected from among perfluoroalkanes, perfluoro cyclic ethers, and perfluoropolyethers.

The perfluoroalkanes and perfluoro cyclic ethers used herein include straight chain, branched chain and cyclic compounds containing 6 to 12 carbon atoms. They typically have a boiling point of 50 to 200° C., and preferably 60 to 150° C. under atmospheric pressure (101.3 kPa). Compounds with a boiling point of lower than 50° C. will volatilize quickly and are thus difficult to handle whereas compounds with a boiling point of higher than 200° C. will volatilize slowly so that the fluoroelastomer composition may remain under-cured.

Examples of suitable perfluoroalkanes include perfluorohexane, perfluoroheptane, perfluorooctane, and perfluorononane. Examples of suitable perfluoro cyclic ethers include perfluoro(2-n-butyltetrahydrofuran), perfluoro(2-n-octyltetrahydrofuran), and perfluoro-15-crown-5-ether. Such perfluoro organic compounds are commercially available under the trade name of Fluorinert® FC-72, FC-75, FC-77, and FC-84 from 3M, for example.

The perfluoropolyethers are compounds consisting essentially of carbon, fluorine and oxygen atoms, and having at least two, preferably at least three, C—O—C ether bonds on the molecule. Specifically, they are compounds comprising recurring units of straight or branched perfluoroether group —$C_\alpha F_{2\alpha}O$—, that is, comprising a perfluoropolyether group of the general formula: $(C_\alpha F_{2\alpha}O)_\beta$ wherein α in each unit is independently an integer of 1 to 6 and β is an integer of 1 to 30. These compounds may be used alone or in admixture of two or more.

The perfluoropolyethers typically have a boiling point of 50 to 200° C., and preferably 60 to 150° C. under atmospheric pressure (101.3 kPa). Also, the perfluoropolyethers typically have a molecular weight of 400 to 2,000, and preferably 550 to 1,500. In the case of a mixture of two or more compounds, its molecular weight is a weight average molecular weight as measured by gel permeation chromatography (GPC) versus polystyrene standards.

The perfluoropolyethers which can be used herein are commercially available or may be prepared by well-known techniques. Typical perfluoropolyethers which can be used herein have the general formula (3).

$$CF_3—[OCF(CF_3)CF_2]_b(OCF_2)_c—O—CF_3 \quad (3)$$

wherein b and c are each independently an integer of more than 0. Preferably, b is in the range of 1 to 11, and c is in the range of 1 to 30, and more preferably b is in the range of 2 to 8, and c is in the range of 1 to 15.

The perfluoropolyethers of formula (3) typically have a boiling point of 50 to 200° C., and preferably 60 to 150° C. under atmospheric pressure (101.3 kPa). In the case of a mixture of compounds having different degrees of polymerization, the mixture should preferably have a substantially uniform boiling point. For example, it is a mixture of perfluoropolyethers which are distillation fractions having a boiling range of up to 8° C., preferably up to 5° C., and more preferably up to 2° C. In this case, the boiling point of the perfluoropolyether mixture is an arithmetic average of two upper and lower limit temperatures of the boiling range.

Examples of the perfluoropolyether are commercially available under the trade name of GALDEN® from Solvay Solexis. Specific examples are GALDEN SV90 compound having a boiling point of 90° C., GALDEN SV110 compound having a boiling point of 110° C., and GALDEN SV135 compound having a boiling point of 135° C., under atmospheric pressure (101.3 kPa) and all satisfying formula (3).

It is noted that the perfluoro organic compounds may be used alone or in admixture of two or more.

The diluent solvent consists of the perfluoroalkyl-substituted aromatic compound and the perfluoro organic compound in a weight ratio in the range from 60/40 to 90/10 and preferably from 70/30 to 85/15.

Particularly in a coating application, the perfluoroalkyl-substituted aromatic compound has a boiling point and the perfluoro organic compound has a boiling point, with a difference between their boiling points being preferably not more than 30° C.

The diluent solvent may be readily prepared by feeding the perfluoroalkyl-substituted aromatic compound and the perfluoro organic compound into a vessel in a predetermined weight ratio, and agitating and mixing the contents at room temperature.

On use, the diluent solvent is blended with the fluoroelastomer composition for dilution. The mixing proportion of the fluoroelastomer composition and the diluent solvent may be selected as appropriate in accordance with the desired thickness of a cured coating resulting from the diluted solution of the fluoroelastomer composition. Typically, the diluent solvent is used in an amount of 10 to 1,000 parts and preferably 25 to 900 parts by weight per 100 parts by weight of the fluoroelastomer composition. With less than 10 pbw of the diluent solvent, the cured coating may have an uneven thickness. With more than 1,000 pbw of the diluent solvent, the cured coating may have a thickness insufficient to exert a coverage effect.

Other Components

In addition to above components (A) to (D), optional ingredients that may also be included in the inventive coating composition to increase its utility include plasticizers, viscosity modifiers, flexibilizers, hydrosilylation catalyst regulators, inorganic fillers, adhesion promoters, and silane coupling agents. These additives may be included in any respective amounts that allow the objects of the invention to be attained and that do not compromise the properties of the coating composition or the cured product obtained therefrom.

Polyfluoromonoalkenyl compounds of the general formula (5) below and/or linear polyfluoro compounds of the general formulas (6) and (7) below may be used as the plasticizer, viscosity modifier and/or flexibilizer.

$$Rf^3—(X')_a—CH=CH_2 \quad (5)$$

In formula (5), X' and "a" are as defined above, and $Rf^3$ has the general formula (iii):

$$F—[CF(CF_3)CF_2O]_w—C_tF_{2t}— \quad (iii)$$

wherein t is an integer of 1 to 3, and w is an integer which is at least 1, but smaller than the sum of p+q (average) plus r and smaller than the sum u+v for the $Rf^1$ group in above component (A).

$$D-O—(CF_2CF_2CF_2O)_c-D \quad (6)$$

In formula (6), D is a group of the formula: $C_sF_{2s+1}—$, wherein s is 1 to 3, and c is an integer which is from 1 to 200, but smaller than the sum of p+q (average) plus r and smaller than the sum u+v for the $Rf^1$ group in above component (A).

$$D-O—(CF_2O)_d(CF_2CF_2O)_e-D \quad (7)$$

In formula (7), D is as defined above, and d and e are each integers of 1 to 200 such that the sum d+e is no larger than the sum of p+q (average) plus r or the sum u+v for the $Rf^1$ group in above component (A).

Examples of polyfluoromonoalkenyl compounds of formula (5) include those of the following structural formulas wherein m satisfies the condition indicated above for formula (5).

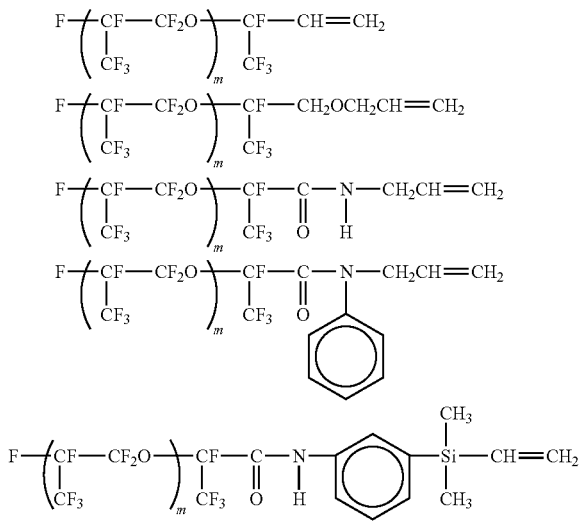

-continued

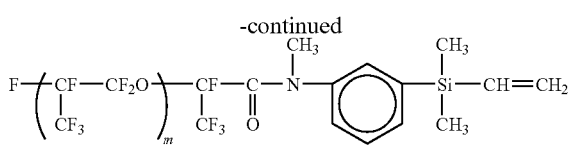

Note that m is an integer of 1 to 200.

Examples of linear polyfluoro compounds of formulas (6) and (7) include those of the following structural formulas wherein n or the sum n+m satisfies the condition indicated above for these formulas.

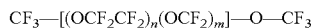

Note that specifically m and n are each an integer from 1 to 200, and the sum m+n is from 2 to 200.

The polyfluoro compounds of formulas (5) to (7) may be included in the inventive composition in an amount of 1 to 50 parts, and preferably 5 to 30 parts by weight, per 100 parts by weight of component (A), linear polyfluoro compound. Desirably, the polyfluoro compounds of formulas (5) to (7) have a viscosity at 23° C. within a range of 5 to 50,000 mPa·s.

Illustrative examples of suitable hydrosilylation catalyst regulators include acetylenic alcohols such as 1-ethynyl-1-hydroxycyclohexane, 3-methyl-1-butyn-3-ol, 3,5-dimethyl-1-hexyn-3-ol, 3-methyl-1-penten-3-ol and phenylbutynol; the reaction products of chlorosilanes having monovalent fluorinated substituents with acetylenic alcohols; 3-methyl-3-penten-1-yne, 3,5-dimethyl-3-hexen-1-yne and triallyl isocyanurate; polyvinylsiloxane, and organophosphorus compounds. The addition of these compounds helps to achieve an appropriate curing reactivity and shelf stability.

Illustrative examples of inorganic fillers include reinforcing or semi-reinforcing fillers such as fumed silica, precipitated silica, colloid silica and hydrophobic forms of the foregoing, quartz powder, fused silica powder, diatomaceous earth and calcium carbonate; inorganic pigments such as titanium oxide, iron oxide, carbon black and cobalt aluminate; heat stabilizers such as titanium oxide, iron oxide, carbon black, cerium oxide, cerium hydroxide, zinc carbonate, magnesium carbonate and manganese carbonate; substances that confer thermal conductivity, such as alumina, boron nitride, silicon carbide and metal powders; and substances that confer electrical conductivity, such as carbon black, silver powder and conductive zinc oxide.

Adhesion promoters such as titanic acid esters and carboxylic anhydrides, and silane coupling agents such as epoxy-containing silanes may also be added to the inventive composition.

Preparation of Coating Composition

The coating (fluoroelastomer) composition of the invention can be prepared by adding above components (A) to (D) and other optional ingredients to the diluent solvent and uniformly mixing on a suitable mixing apparatus, such as a planetary mixer, Ross mixer or Hobart mixer. If necessary, an apparatus such as a kneader or a three-roll mill may also be used for intimately working the mixture.

No particular limitation is imposed on the method for preparing the coating composition. For example, preparation may involve blending all of the components together. Alternatively, the components may be prepared as two separate compositions, which are then mixed at the time of use.

From the dilute solution of the fluoroelastomer composition (i.e., coating composition), a cured coating is prepared by any procedure, preferably a procedure involving applying the dilute solution onto a substrate by dipping, spray coating, roll coating or spin coating, holding the applied solution at room temperature for 10 to 60 minutes for allowing the solvent to volatilize off, then heating the coating for curing. In order for the coating to achieve a firm bond to various substrate, the coating is preferably cured by heating at a temperature of at least 60° C., more preferably 100 to 200° C. for several minutes to several hours.

The coating compositions of the invention are diluted solutions of the fluoroelastomer compositions which are used as protective coatings on automotive-related components and electrical and electronic components while the diluent solvent is also useful as a cleaning solvent for the fluoroelastomer compositions. For example, the coating compositions are suited in forming protective coatings for detectors and sensors, such as various types of pressure sensors, gas concentration detectors, and temperature sensors used in automotive control systems. The inventive compositions also lend themselves well to use as protective sealants and coatings for sensors exposed to various gases, hot water and chemicals, ink jet printer parts, and various types of circuit boards.

Example

Examples and comparative examples are given below by way of illustration of the invention and not by way of limitation. All parts are by weight.

Dilute solutions of fluoroelastomer compositions are prepared using diluent solvents. A series of diluent solvents and fluoroelastomer compositions (a) to (c) were prepared beforehand.

Diluent Solvents

Diluent solvents were prepared by mixing at room temperature a perfluoroalkyl-substituted aromatic compound and a perfluoro organic compound according to the formulation shown in Tables 1 and 2. The solution state was observed and reported in Tables 1 and 2.

Fluoroelastomer Composition (a)

A planetary mixer was charged with 100 parts of a polymer of formula (8) below (viscosity, 10,000 mPa-s; number-average molecular weight, 17,000; vinyl group content, 0.012 mol/100 g). 10 parts of fumed silica that had been surface treated with dimethyldichlorosilane (BET specific surface area, 270 m$^2$/g) was added, and these ingredients were worked together for one hour without heating. The mixer was then heated while the ingredients continued to be worked. After the internal temperature reached 150° C., heat treatment was carried out for two hours under a reduced pressure (60 Torr) while holding the temperature at 150 to 170° C. The mixer contents were then cooled to 40° C. or below. Thereafter, the mixture was passed twice through a three-roll mill, yielding a base compound.

To 22.0 parts of the base compound, 80.0 parts of the polymer of formula (8), 0.25 part of a toluene solution of a platinum-divinyltetramethyldisiloxane complex (platinum concentration, 0.5 wt %), 0.30 part of a 50% toluene solution of ethynyl cyclohexanol, 1.9 parts of a fluorinated organohydrogensiloxane of formula (9) below, 1.1 parts of a fluorinated organohydrogensiloxane of formula (10), and 1.0 part of a tackifier of formula (11) below were successively added. The contents were mixed to uniformity, followed by deaeration, yielding a fluoroelastomer composition (a).

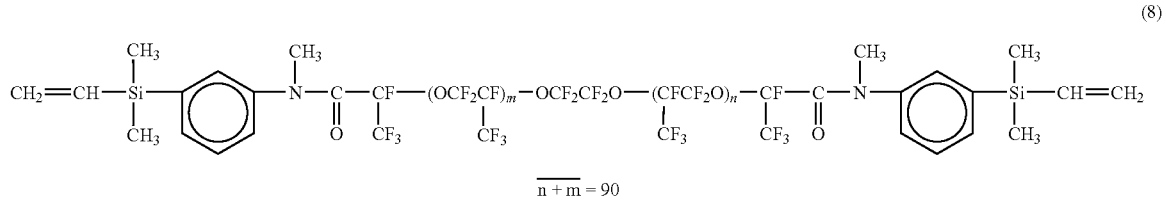

(8)

$$\overline{n+m}=90$$

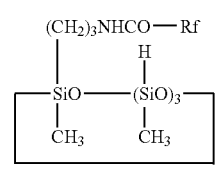

(9)

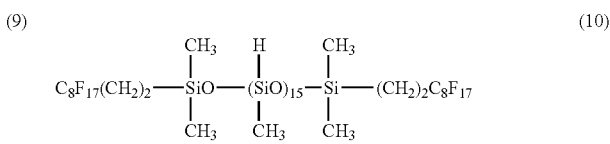

(10)

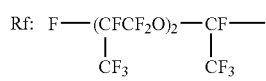

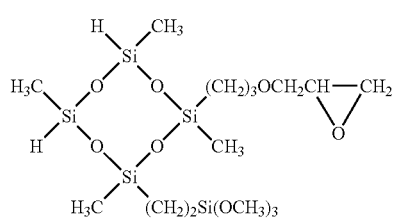

(11)

Fluoroelastomer Composition (b)

A fluoroelastomer composition (b) was prepared by the same procedure as composition (a), except that 1.7 parts of a fluorinated organohydrogensiloxane of formula (12) below was used instead of the fluorinated organohydrogensiloxane of formula (9) and 4.5 parts of a tackifier of formula (13) below was used instead of the tackifier of formula (11).

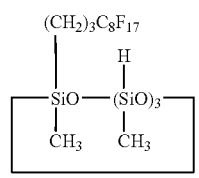

(12)

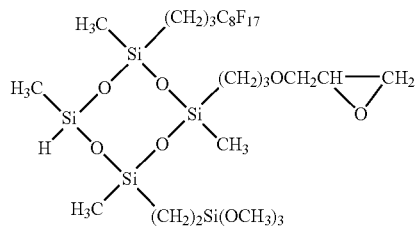

(13)

Fluoroelastomer Composition (c)

A fluoroelastomer composition (c) was prepared by the same procedure as composition (b), except that 2.5 parts of a tackifier of formula (14) below was used instead of the tackifier of formula (13).

(14)

Coating solutions were prepared by mixing the fluoroelastomer compositions (a) to (c) with the diluent solvents in accordance with the formulation shown in Tables 1 and 2. The solutions were visually observed whether or not the solution separated into liquid layers. The results are shown in Tables 1 and 2. Each of the solutions was agitated and mixed and immediately thereafter brush coated onto an aluminum substrate (100 mm×25 mm×1 mm). The coating was air dried for 30 minutes and heated at 150° C. for one hour. The coating on the aluminum substrate was visually observed. The state of the coating was evaluated satisfactory "○" when it was uniform and smooth, fair "Δ" when it was unsmooth and locally uneven, and poor "X" when it was uneven overall. The results are also shown in Tables 1 and 2.

TABLE 1

| Coating composition formulation | | Comparative Example | | Example | | | | | | Comparative Example |
|---|---|---|---|---|---|---|---|---|---|---|
| (pbw) | | 1 | 2 | 1 | 2 | 3 | 4 | 5 | 6 | 3 |
| Fluoroelastomer composition (a) | | 20 | 20 | 20 | 20 | | | 20 | 20 | 20 |
| Fluoroelastomer composition (b) | | | | | | 20 | | | | |
| Fluoroelastomer composition (c) | | | | | | | 20 | | | |
| Diluent solvent | | 80 | 80 | 80 | 80 | 80 | 80 | 80 | 80 | 80 |
| Diluent formulation (%) | 1,3-bis(trifluoro-methyl)benzene | 100 | 95 | 90 | 80 | 80 | 80 | 70 | 60 | 55 |
| | Fluorinert FC77 | | 5 | 10 | 20 | 20 | 20 | 30 | 40 | 45 |
| | GALDEN SV135 | | | | | | | | | |
| Solution state of diluent | | uniform, clear | uniform, clear | uniform, clear | uniform, clear | uniform, clear | uniform, clear | uniform, clear | uniform, clear | uniform, clear |
| Evaluation | Layer separation | No | No | No | No | No | No | No | No | Separated |
| | Coating state | Δ | Δ | ○ | ○ | ○ | ○ | ○ | ○ | X |

TABLE 2

| Coating composition formulation | | Comparative Example | Example | | | | Comparative Example | |
|---|---|---|---|---|---|---|---|---|
| (pbw) | | 4 | 7 | 8 | 9 | 10 | 5 | 6 |
| Fluoroelastomer composition (a) | | 20 | 20 | 20 | 20 | | | |
| Fluoroelastomer composition (b) | | | | | | 20 | | |
| Fluoroelastomer composition (c) | | 69 | 46 | 29 | | | 20 | 20 |
| Diluent solvent | | 80 | 80 | 80 | 80 | 80 | 80 | 80 |
| Diluent formulation (%) | 1,3-bis(trifluoro-methyl)benzene | 95 | 90 | 80 | 70 | 60 | 55 | |
| | Fluorinert FC77 | | | | | | | |
| | GALDEN SV135 | 5 | 10 | 20 | 30 | 40 | 45 | 100 |
| Solution state of diluent | | uniform, clear | uniform, clear | uniform, clear | uniform, clear | uniform, clear | uniform, clear | uniform, clear |
| Evaluation | Layer separation | No | No | No | No | No | Separated | Separated |
| | Coating state | Δ | ○ | ○ | ○ | ○ | X | X |

Note:
Fluorinert FC77 is a mixture of perfluorooctane and perfluoro(2-n-butyltetrahydrofuran) by 3M.
GALDEN SV135 is a perfluoropolyether by Solvay Solexis.

Japanese Patent Application No. 2006-299771 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A coating composition comprising;
100 parts by weight of a fluoroelastomer composition; and
10 to 1,000 parts by weight of a diluent solvent consisting of a perfluoroalkyl-substituted aromatic compound and at least one perfluoro organic compound selected from the group consisting of a perfluoroalkane and perfluoro cyclic ether, in a weight ratio in the range from 60/40 to 90/10, wherein
said fluoroelastomer composition comprises
(A) a linear polyfluoro compound containing at least two alkenyl groups per molecule and having a perfluoropolyether structure in its backbone,
(B) a fluorinated organohydrogensiloxane having at least two silicon-bonded hydrogen atoms per molecule,
(C) a platinum group metal catalyst, and
(D) an organopolysiloxane containing per molecule at least one hydrogen atom bonded to a silicon atom directly and at least one group selected from among epoxy and trialkoxysilyl groups, which is bonded to a silicon atom via a carbon atom or carbon and oxygen atoms.

2. The coating composition of claim 1 wherein said perfluoroalkyl-substituted aromatic compound has the general formula (2):

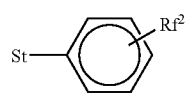

(2)

wherein St is H or $CF_3$, and $Rf^2$ is a straight or branched perfluoroalkyl group of 1 to 4 carbon atoms.

3. The coating composition of claim 1 wherein component (A) is a linear polyfluoro compound having the general formula (1):

$$CH_2=CH-(X)_a Rf^1-(X')_a-CH=CH_2 \qquad (1)$$

wherein X is $-CH_2-$, $-CH_2O-$, $-CH_2OCH_2-$ or $-Y-NR-CO-$; Y is $-CH_2-$ or an o-, m- or p-dimethylsilylphenylene group of structural formula (Z):

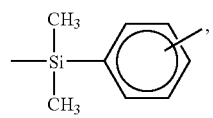

(Z)

and R is hydrogen or a substituted or unsubstituted monovalent hydrocarbon group;

X' is —CH$_2$—, —OCH$_2$—, —CH$_2$OCH$_2$— or —CO—NR—Y'—; Y' is —CH$_2$— or an o-, m- or p-dimethylsilylphenylene group of structural formula (Z'):

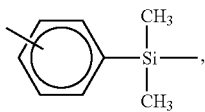   (Z')

and R is as defined above;

the subscript "a" is independently 0 or 1;

Rf$^1$ is a divalent perfluoropolyether group of the general formula (1):

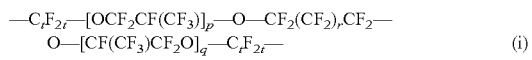   (i)

wherein p and q are integers of 1 to 150, the sum of p and q is 2 to 200 on average, r is an integer of 0 to 6, and t is 2 or 3, or a divalent perfluoropolyether group of the general formula (ii):

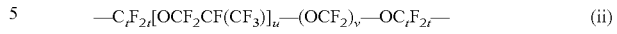   (ii)

wherein u is an integer of 1 to 200, v is an integer of 1 to 50, and t is as defined above.

4. The coating composition of claim 1 wherein said fluorinated organohydrogensiloxane (B) has on the molecule at least one group selected from among monovalent perfluoroalkyl groups, monovalent perfluorooxyalkyl groups, divalent perfluoroalkylene groups and divalent perfluorooxyalkylene groups.

5. The coating composition of claim 1 wherein said organosiloxane (D) further contains per molecule at least one monovalent perfluoroalkyl or monovalent perfluorooxyalkyl group bonded to a silicon atom via a carbon atom or carbon and oxygen atoms.

6. The coating composition of claim 1, wherein the perfluoroalkyl-substituted aromatic compound is 1,3-bis(trifluoromethyl)benzene.

* * * * *